US010728064B2

(12) United States Patent
Mangst et al.

(10) Patent No.: US 10,728,064 B2
(45) Date of Patent: Jul. 28, 2020

(54) INTERFACE CIRCUIT

(71) Applicant: Infineon Technologies AG, Neubiberg (DE)

(72) Inventors: Maximilian Mangst, Rott am Inn (DE); Eric Pihet, Munich (DE); Thorsten Hinderer, Neubiberg (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 16/296,042

(22) Filed: Mar. 7, 2019

(65) Prior Publication Data

US 2019/0288886 A1    Sep. 19, 2019

(30) Foreign Application Priority Data

Mar. 15, 2018    (DE) .......................... 10 2018 106 085

(51) Int. Cl.
*H04L 25/49*    (2006.01)
*H04L 7/04*    (2006.01)
*H04L 25/02*    (2006.01)
*H04L 25/493*    (2006.01)

(52) U.S. Cl.
CPC .......... *H04L 25/4917* (2013.01); *H04L 7/042* (2013.01); *H04L 25/0266* (2013.01); *H04L 25/493* (2013.01)

(58) Field of Classification Search
CPC ............... H04L 7/0008; H04L 25/4917; H04L 25/4904; H04L 7/033
See application file for complete search history.

(56) References Cited

U.S. PATENT DOCUMENTS

| 2011/0026612 A1* | 2/2011 | Lombardo | .......... H04L 25/0266 375/257 |
| 2011/0289248 A1 | 11/2011 | Djabbari et al. | |
| 2015/0229149 A1* | 8/2015 | Fahlenkamp | ......... H02J 7/0044 320/114 |

OTHER PUBLICATIONS

Office Action, in the German language, from counterpart German Application No. 102018106085.8, dated Jan. 10, 2019, 4 pp.

* cited by examiner

*Primary Examiner* — Shuwang Liu
*Assistant Examiner* — Gina M McKie
(74) *Attorney, Agent, or Firm* — Shumaker & Sieffert, P.A.

(57) ABSTRACT

A method for a bus interface circuit is described. According to one exemplary embodiment, the method comprises coding a first data stream by assigning first symbols to falling and rising edges of the first data stream, and coding a further data stream by assigning second symbols to the edges or levels of said further data stream. A symbol sequence is constructed from the first symbols and second symbols, wherein said symbol sequence is constructed in such a manner that the first symbols are always delayed by the same value relative to the associated edges of the first data stream. The method also comprises transmitting the symbol sequence via a galvanically isolating component, and decoding the symbol sequence transmitted via the galvanically isolating component in order to reconstruct the first data stream and the further data stream.

21 Claims, 10 Drawing Sheets

INTERFACE CIRCUIT

TECHNICAL FIELD

The present description relates to the field of data buses, in particular bus interface circuits for serial buses.

BACKGROUND

Data buses are used for digital communication between two or more electronic devices. A device connected to a bus is often referred to as a bus node. In general, the expression "bus" usually denotes a communication system which comprises both the specification of the bus hardware and a communication protocol, according to which the bus nodes communicate. Many data buses are standardized, wherein different bus standards prevail in different fields of industry. For example, CAN (Controller Area Network), LIN (Local Interchange Network) and FlexRay are often used in the automotive industry (but also in other industrial fields of use). Said examples are from the category of field buses.

If data transmission between bus nodes in different supply voltage domains (for example 12 V/48 V in automotive applications) is desired in a communication system, galvanic isolation is usually provided in the transmission path. However, galvanic isolation can also be useful for the purpose of overvoltage protection or for other reasons even if different voltage domains having different supply voltages are not used. This galvanic isolation is implemented, for example, by means of components such as optocouplers, integrated coreless transformers, coupling capacitors, etc. Such components can be integrated in bus interface circuits which form an interface between the bus lines and an electronic device, for example a microcontroller. At the same time, the bus interface circuit also forms an interface between two supply voltage domains.

Known bus interface circuits can have a galvanically isolating component, for example an integrated coreless transformer, for each data stream (digital signal) to be transmitted. In many applications, not only the data stream to be transmitted via the bus (uplink data stream) and the data stream received by the bus (downlink data stream) are transmitted via galvanically isolating components within the bus interface circuit but also further signals, for example status and diagnostic signals. Additional galvanically isolating components are used to transmit these signals, which results in a comparatively high chip area requirement in integrated bus interface circuits.

SUMMARY

A bus interface circuit is described. According to one exemplary embodiment, the bus interface circuit has a galvanically isolating component as well as a coding circuit and a decoding circuit which are coupled via the galvanically isolating component. The coding circuit is designed to receive a first data stream and at least one further data stream, to code the first data stream by assigning first symbols to falling and rising edges of the first data stream, and to code the at least one further data stream by assigning second symbols to the edges or levels of said further data stream. A symbol sequence is constructed from the first symbols and second symbols, is supplied to the galvanically isolating component and is transmitted via the latter. The decoding circuit receives the symbol sequence and is designed to decode the symbol sequence and to reconstruct the first data stream and the at least one further data stream therefrom. In this case, the coding circuit is designed to construct the symbol sequence in such a manner that the first symbols are always delayed by the same value relative to the associated edges of the first data stream.

A method for a bus interface circuit is also described. According to one exemplary embodiment, the method comprises coding a first data stream by assigning first symbols to falling and rising edges of the first data stream, and coding a further data stream by assigning second symbols to the edges or levels of said further data stream. A symbol sequence is constructed from the first symbols and second symbols, wherein the symbol sequence is constructed in such a manner that the first symbols are always delayed by the same value relative to the associated edges of the first data stream. The method also comprises transmitting the symbol sequence via a galvanically isolating component, and decoding the symbol sequence transmitted via the galvanically isolating component in order to reconstruct the first data stream and the further data stream.

BRIEF DESCRIPTION OF THE DRAWINGS

Exemplary embodiments are explained in more detail below on the basis of figures. The illustrations are not necessarily true to scale and the exemplary embodiments are not only restricted to the aspects illustrated. Rather, importance is placed on illustrating the principles on which the exemplary embodiments are based. In the figures.

DETAILED DESCRIPTION

The examples described here relate to bus interface circuits for CAN bus systems. It goes without saying that the concepts described here can also be easily applied to other bus systems, for example LIN, Flexray or Profibus (Process Field Bus). The following description is therefore not restricted to CAN bus systems. It is also noted that the concepts described here can be used not only in the automotive sector but also in other industrial applications.

Figure 1:
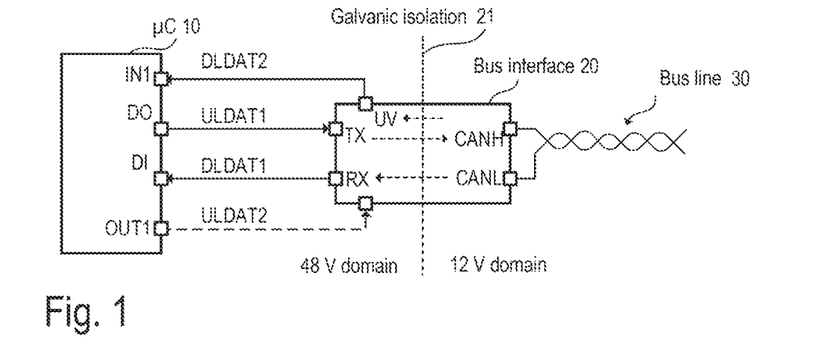
FIG. 1 illustrates an example of a bus node having a microcontroller and a bus interface circuit for a CAN bus.

FIG. 1 illustrates a general example of a bus node having a microcontroller 10 and a bus interface circuit 20 (bus interface for short) for a CAN bus (bus lines 30). It goes without saying that the example is a simplified illustration which contains only those elements which are required for the following explanations. The microcontroller 10 processes both the data to be transmitted via the bus and the data received by the bus, wherein the data are transmitted as serial data streams having a format corresponding to the bus protocol (for example CAN-FD protocol according to ISO 11898-1:2015). In the example illustrated, the data stream to be transmitted via the bus is referred to as the uplink data stream ULDAT1 and the data stream received by the bus is referred to as the downlink data stream DLDAT1 The downlink data stream DLDAT2 comes from another data source and was not received via the bus lines 30. The data stream DLDAT2 may contain, for example, status and diagnostic information (for example undervoltage warning) which can be produced by circuits contained in the bus interface 20. In the same manner, the uplink data stream may contain, for example, status and diagnostic information which can be provided by the microcontroller 10 (or other sources), for example, and is intended to be transmitted to the other voltage domain. It goes without saying that, in some exemplary embodiments, a further data stream ULDAT2 or DLDAT2 is transmitted only in the uplink or downlink path and only a single data stream (ULDAT1 or DLDAT1) is transmitted in the other direction.

The bus interface 20 contains galvanic isolation 21 which is also sometimes referred to as a galvanic isolation barrier. The bus interface 20 is designed to receive the data stream ULDAT1 via an external contact (for example TX pin), to transmit this data stream ULDAT1 via the isolation barrier 21 and to convert it into a corresponding bus signal. In the case of a CAN bus, this bus signal is a differential voltage signal which is provided at the external contacts (pins) CANE and CANT The contacts CANH and CANL are connected to the bus lines 30 (for example a twisted-pair cable). In the same manner, a data stream received by the bus is transmitted via the isolation barrier 21 and is made available to the microcontroller 10 at an external contact (for example RX pin) as a downlink data stream DLDAT1. Status and diagnostic information which is generated (in the figure) to the right of the isolation barrier 21 can also be transmitted via the isolation barrier 21 as a data stream/digital signal DLDAT2 and can be made available to the microcontroller 10 at a further external contact (for example UV pin). Optionally, status and diagnostic information can also be transmitted in the other direction (from the 48 V domain to the 12 V domain in the example illustrated) as a data stream/digital signal ULDAT2.

As mentioned, the bus interface 20 can also be used as an interface between two supply voltage domains. In the example illustrated, all components to the right of the isolation barrier 21 are supplied via a 12 V voltage supply and all components to the left of the isolation barrier 21 are supplied via a 48 V voltage supply. There is no direct electrical (galvanic) connection between the two supply voltage domains. Information is transmitted solely via the isolation barrier 21. The latter may have a separate galvanically isolating component (for example a coreless transformer) for each data stream to be transmitted. In the example illustrated, the isolation barrier 21 comprises, for example, three coreless transformers for transmitting the data streams ULDAT1, DLDAT1 and DLDAT2.

Figure 2:
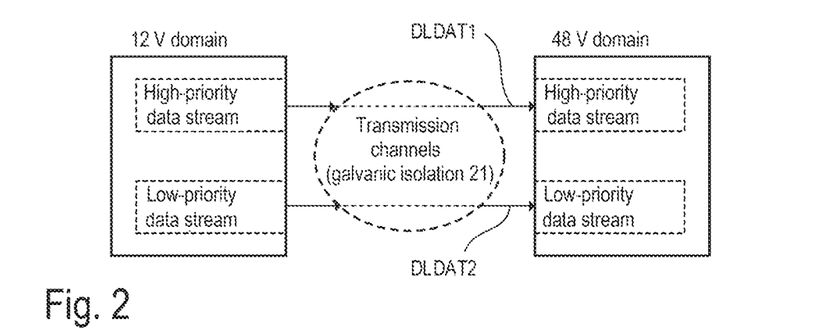
FIG. 2 is a diagram for illustrating the transmission paths used in a bus interface circuit, wherein a galvanically isolating component is used for each data stream to be transmitted.

FIG. 2 is a diagram for functionally illustrating an example of the transmission of data via the isolation barrier 21 within an integrated bus interface circuit 20, wherein only the downlink data streams are illustrated. The situation is the same for uplink data streams and only the direction of the data transmission is reversed. In the example illustrated, two downlink data streams are transmitted in the interface circuit, a first data stream DLDAT1, which has a high priority, and a second data stream DLDAT2, which has a low priority. The high-priority data stream DLDAT1 contains those data which have been received by the bus. This data stream DLDAT1 has a format according to the bus protocol used, wherein comparatively high requirements with respect to jitter have to be met. As mentioned, the low-priority data stream DLDAT2 may contain status and diagnostic data. The data streams DLDAT1 and DLDAT2 are asynchronous and are transmitted via separate galvanically isolating components in known bus interface circuits. If the isolation barrier 21 is implemented by means of coreless transformers, such a bus interface circuit comprises at least two coreless transformers for the high-priority uplink and downlink data streams and an additional coreless transformer for each further (uplink or downlink) data stream to be transmitted. In the case illustrated in FIG. 1, this would be three coreless transformers.

Figure 3:
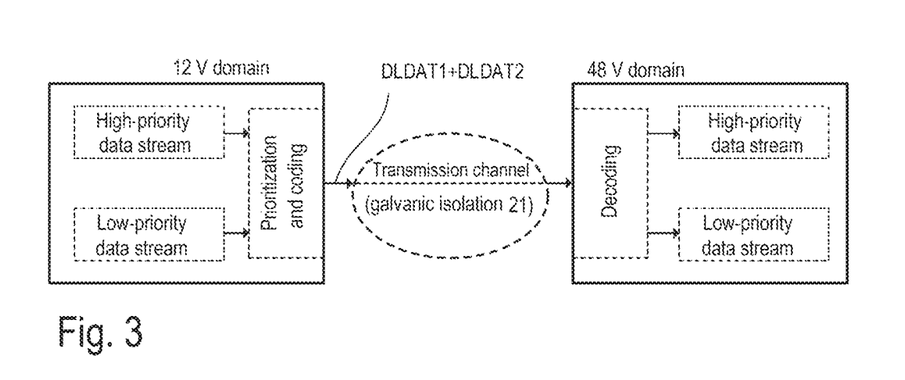
FIG. 3 is a diagram for illustrating the transmission paths used in a bus interface circuit, wherein a plurality of data streams are transmitted via the same galvanically isolating component.

FIG. 3 is a diagram for functionally illustrating a further example of the transmission of data via the isolation barrier 21 within an integrated bus interface circuit 20. Like in FIG. 2, only the downlink data streams are illustrated. However, unlike in FIG. 2, the two data streams DLDAT1 and DLDAT2 are transmitted using the same galvanically isolating component. In order to make this possible, the data streams to be transmitted are coded and transmitted together (as one data stream). The data stream is decoded on the other side of the isolation barrier 21, as a result of which the two data streams DLDAT1 and DLDAT2 are reconstructed again. If this approach is used, only a single coreless transformer is respectively required for the downlink data streams and the uplink data streams for transmitting the data.

Figure 4:
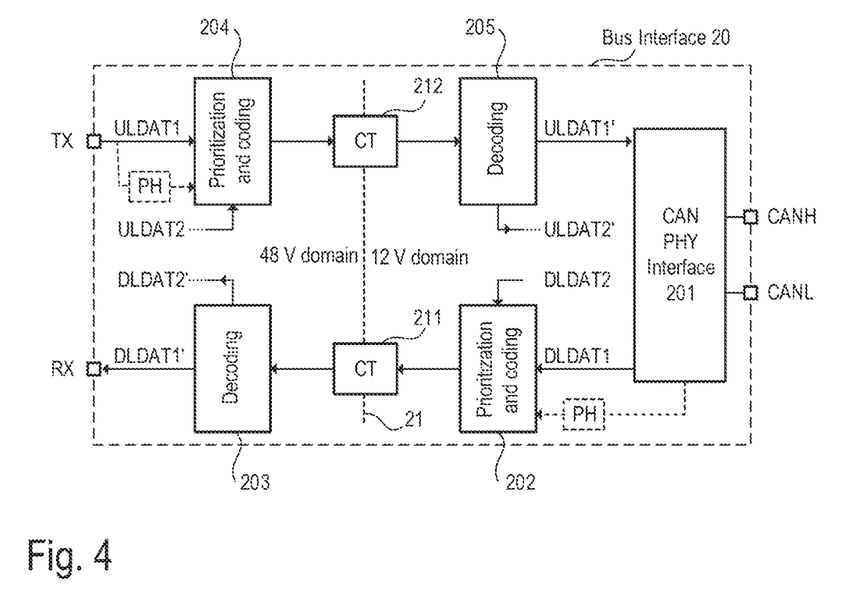
FIG. 4 is a block diagram of a first exemplary embodiment of a bus interface circuit for a CAN bus, wherein two or more uplink or downlink data streams are transmitted via the same coreless transformers.

FIG. 4 is a block diagram of a first exemplary embodiment of a bus interface circuit for a CAN bus, wherein two or more uplink or downlink data streams are transmitted via the same coreless transformers. As mentioned, the structure illustrated can also be applied to other bus systems. The example illustrated in FIG. 4 comprises an interface circuit 201 (physical CAN interface, CAN-PHY) which is connected to the external contacts CANH and CANL and is designed to convert a bus signal received at the external contacts CANH and CANL into a corresponding downlink data stream DLDAT1. The interface circuit 201 is also designed to receive an uplink data stream ULDAT1' and to convert it into a corresponding bus signal which is made available at the external contacts CANH and CANL. With respect to the bus system, the interface circuit 201 substantially forms the physical layer within the Open Systems Interconnection (OSI) model (therefore the abbreviation CAN PHY). Various implementations of interface circuits are known per se and are therefore not explained any further here.

The example illustrated in FIG. 4 also comprises coding circuits 202 and 204. The coding circuit 202 is designed to receive the downlink data stream DLDAT1 generated by the interface circuit 201 and at least one further downlink data stream DLDAT2 and to combine the received data streams in one downlink data stream using special coding. The coding circuit 204 is designed, as it were, to receive the uplink data stream ULDAT1 supplied at the external contact TX and at least one further uplink data stream ULDAT2 and to combine the received data streams in one uplink data stream using special coding.

The bus interface 20 according to FIG. 4 also comprises an isolation barrier 21 having the coreless transformers 211 and 212, wherein the coreless transformer 211 transmits the coded downlink data stream and the coreless transformer 212 transmits the coded uplink data stream. The uplink and downlink data streams transmitted via the isolation barrier 21 are supplied to the decoding circuits 203 and 205. The decoding circuit 203 is designed to decode the downlink data stream transmitted via the isolation barrier 21 and to reconstruct the downlink data streams DLDAT1 and DLDAT2 again. The reconstructed downlink data streams are denoted DLDAT1' and DLDAT2'. The reconstructed downlink data stream DLDAT1' is provided at the external contact RX. The decoding circuit 205 is designed to decode the uplink data stream transmitted via the isolation barrier 21 and to reconstruct the uplink data streams ULDAT1 and ULDAT2 again. The reconstructed uplink data streams are denoted ULDAT1' and ULDAT2'. The reconstructed uplink data stream ULDAT1' is supplied to the interface circuit 201 (CAN PHY). It is noted at this point that the low-priority data streams ULDAT2 and DLDAT2 can be generated "on-chip". In this case, the source of the data stream DLDAT2, for example, may be a circuit which is contained in the bus interface 20, for example a circuit which generates diagnostic and status signals relating to the physical CAN interface 201. In some exemplary embodiments, the data stream ULDAT2, for example, can be received via an external pin of the bus interface 20 and can be supplied to the coding circuit 204. This may be useful, for example, when low-priority data or signals are intended to be transmitted from one voltage domain (for example 48 V) to another voltage domain (for example 12 V). A low-priority data stream ULDAT2 supplied via an external pin can be generated by the microcontroller 10, for example (cf. FIG. 1). The source of the further data streams ULDAT2 and DLDAT2 is irrelevant for the use of the concepts described here.

The data streams ULDAT1 and DLDAT1 contain the data to be transmitted via the bus in a format corresponding to the bus protocol. These data streams therefore have a comparatively high priority. The coding circuits 202 and 204 can therefore transmit the data streams ULDAT1 and DLDAT1 with preference (that is to say with higher priority than) the further data streams ULDAT2 and DLDAT2 via the coreless transformers 211 and 212 in order to keep the latencies and the jitter low in the data streams ULDAT1 and DLDAT1. Various approaches for coding two asynchronous data streams (for example downlink data streams DLDAT1 and DLDAT2) such that they can be transmitted via a single coreless transformer (or another galvanically isolating component) using a time-division multiplex method are discussed below. In this case, the coding circuits 202, 204 autonomously determine the time slots for transmitting the coded data streams.

Three different approaches for coding and transmitting two or more data streams via a coreless transformer are described below. All approaches take into account the problem that a collision which would delay the transmission of the higher-priority data stream is intended to be prevented when transmitting the data via the coreless transformer. The data to be transmitted via a coreless transformer (or another galvanically isolating component) are coded in such a manner that only the edges of the high-priority data stream are coded, that is to say particular symbols are assigned to the rising and falling edges of the high-priority data stream. For example, a first symbol is transmitted via the coreless transformer if the state of the data stream ULDAT1 changes from dominant to recessive and a second symbol is transmitted if the state of the data stream ULDAT1 changes from recessive to dominant. Other symbols are used for coding the data stream ULDAT2. The symbols are combined to form a symbol sequence and this symbol sequence is transmitted via the coreless transformer.

The transmission via a coreless transformer using different symbols is known per se and is therefore not explained any further. However, the approaches described here can ensure that no conflicts occur during the transmission of two data streams if symbols are transmitted via the coreless transformer. For this purpose, the symbol sequence is constructed in the coding circuits 202, 204 in such a manner that the symbols assigned to the edges of the high-priority data stream ULDAT1 or DLDAT1 are always delayed by the same value (which may also be approximately zero) relative to the associated edges in order to avoid jitter in the high-priority data stream. The transmission of the symbols assigned to the edges or logic levels of the low-priority data stream ULDAT2 or DLDAT2 is delayed in the event of an imminent collision (that is to say if two symbols would have to be transmitted at the same time without delay), as a result of which jitter is indeed produced, but is not critical in low-priority data streams.

As mentioned, the high-priority data stream (for example downlink data stream DLDAT1) is formatted according to a bus protocol. According to a first approach, deterministic gaps in the data transmission which are stipulated in the bus protocol are used to transmit the lower-priority data stream (for example downlink data stream DLDAT2) via the coreless transformer. Suitable gaps can be detected by a protocol handler PH and can be signaled to the respective coding circuit 202 or 204. For the uplink data stream ULDAT1, the protocol handler can be implemented in the microcontroller (see FIG. 1) which also generates the uplink data stream. Alternatively, a protocol handler may also be implemented in the bus interface 20. For the downlink data stream DLDAT1, a protocol handler may likewise be integrated in the bus interface 20 and may be coupled to the bus transceiver 210. However, a protocol handler PH is not necessary in all exemplary embodiments and is therefore optional.

Figure 5:
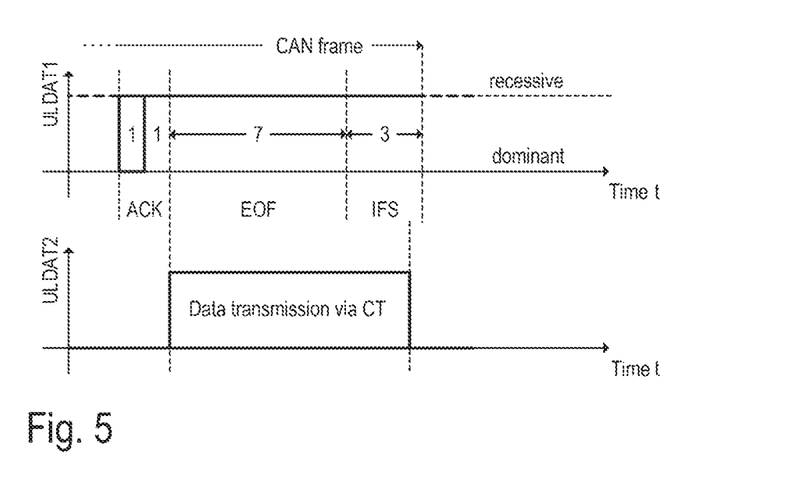
FIG. 5 uses timing diagrams to illustrate the transmission of data via a coreless transformer during transmission gaps defined in the CAN protocol.

In the case of a CAN bus, the bus protocol provides a pause between two frames which corresponds to the length of ten bits, seven bits of which are recessive bits of the end-of-frame (EOF) field and three of which are recessive bits of the intermission-frame-space (IFS) field. During this pause, a signal is not transmitted on the CAN bus and the bus is in a recessive state. Consequently, the high-priority data streams DLDAT1 and ULDAT1 will also have these gaps between two frames, and these gaps can be used to transmit the lower-priority data streams. This situation is illustrated in the timing diagrams in FIG. 5. The upper timing diagram in FIG. 5 illustrates the end of a CAN frame of the data stream ULDAT1. The last bit of the data transmission is effected in the first bit of the so-called acknowledge (ACK) field which is followed by a recessive bit (ACK delimiter bit). The mentioned pause with a length of 10 bits (EOF and IFS fields) in which the bus has a recessive state then follows. With the beginning of the EOF field, the transmission of the lower-priority data stream ULDAT2 can start, for example via the coreless transformer 211 (see FIG. 4) (see lower diagram in FIG. 5). This data transmission should be concluded by the end of the IFS field. In the example illustrated, the data stream ULDAT2 is transmitted in a time slot having the length of 9 bits of the data stream ULDAT1.

A further deterministic gap can be produced after the arbitration field of a CAN frame. During this arbitration phase, a bus node (that is to say the protocol handler) decides whether data continue to be transmitted or whether the transmission is stopped. If the transmission is stopped, the protocol handler "knows" that no data are transmitted to the bus until the next acknowledge delimiter bit is received. This gap can also be used to transmit the lower-priority data stream via the coreless transformer 212. However, this approach functions only for uplink data streams and presupposes that the bus communication is active. If the bus is inactive, low-priority data streams cannot be transmitted either because the inactivity period is not guaranteed.

According to a modified approach, the data streams are transmitted via a coreless transformer in an interleaved manner. This situation is illustrated, by way of example, in FIG. 6. The first (upper) timing diagram shows an example of a data stream DLDAT1 which was received by the CAN transceiver (see FIG. 4). The clock signal of the transmitter is recovered (clock recovery) on the basis of this data stream, wherein, in the example illustrated, the clock signal $CLK_R$ is synchronized with the falling edges in the data stream DLDAT1 (see FIG. 6, second diagram). A period of the clock signal corresponds to the duration of one bit in the data stream DLDAT1. The low-priority data stream DLDAT2 is asynchronous with respect to the data stream DLDAT1 (see FIG. 6, third diagram). However, the data stream DLDAT2 is synchronized by sampling it approximately in the middle of a bit period of the data stream DLDAT1. In the example illustrated, the low-priority data stream DLDAT2 is sampled in sync with the rising edges of the regenerated clock signal $CLK_R$. The sampled/synchronized low-priority data signal is denoted DLDAT2* (see FIG. 6, fourth diagram). For the transmission of the data streams DLDAT1 and DLDAT2* via the coreless transformer, the edges of the data stream DLDAT1 are coded with a positive current pulse (first symbol) and the edges of the data stream DLDAT2* are coded with a negative current pulse (second symbol). Since the edges of the synchronized data stream DLDAT2* are always in the middle of a bit period of the data stream DLDAT1, no collisions can occur during transmission via the coreless transformer (cf. FIG. 4, coreless transformer 211). The current pulses (also called symbols) transmitted via the coreless transformer are illustrated in the lowermost diagram. The current flowing through the primary side of the coreless transformer is denoted $i_{CT}$. Different symbols can be used to transmit rising and falling edges (which need not necessarily be the case). The edges of the signals DLDAT1 and DLDAT2* are likewise distinguished by the use of different symbols. Examples of different symbols are also explained below (cf. also FIG. 11).

Figure 6:
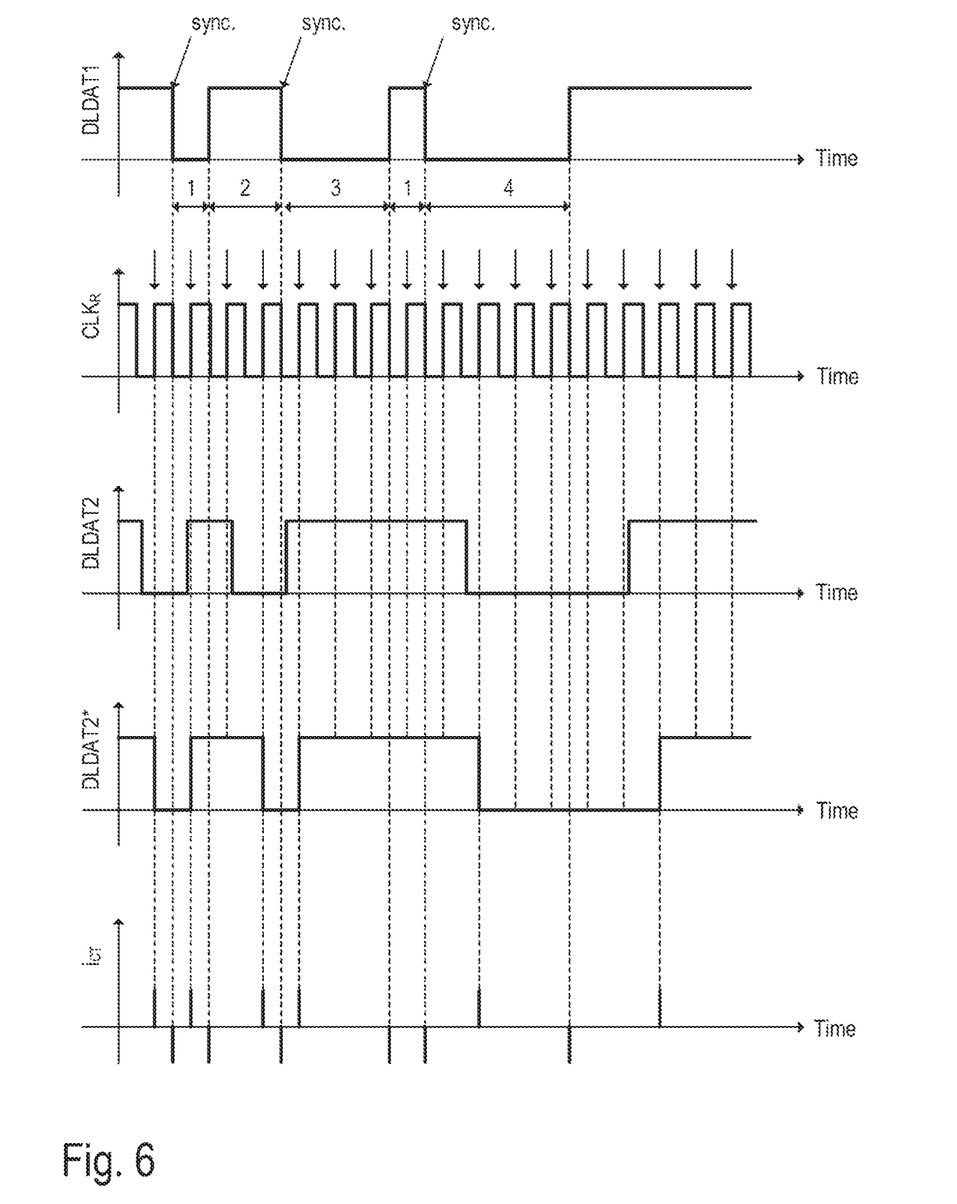
FIG. 6 uses timing diagrams to illustrate the transmission of data via a coreless transformer in the middle of a bit period of the CAN data stream.

The approach described with respect to FIG. 6 can be used to transmit both uplink data streams and downlink data streams. When transmitting uplink data streams, the clock signal need not be recovered from the data stream ULDAT1 since it can be provided by the protocol handler anyway. When transmitting downlink data streams, it is necessary to regenerate the clock signal. However—as mentioned—transmission of low-priority data streams may be problematic if the bus communication is inactive because the inactivity period is not guaranteed.

Figure 7:
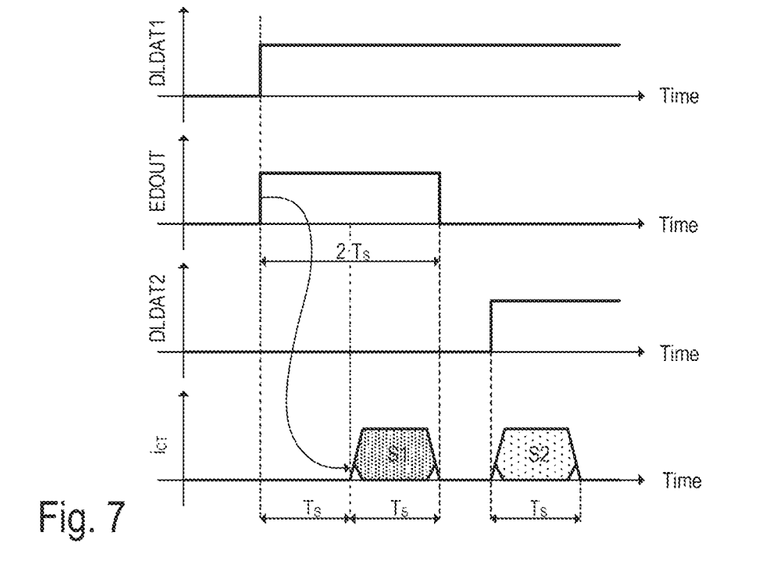
FIGS. 7-9 use exemplary timing diagrams to illustrate a scheme for simultaneously transmitting two or more data streams via a coreless transformer and a mechanism for avoiding collisions by introducing a deterministic delay.
Figure 8:
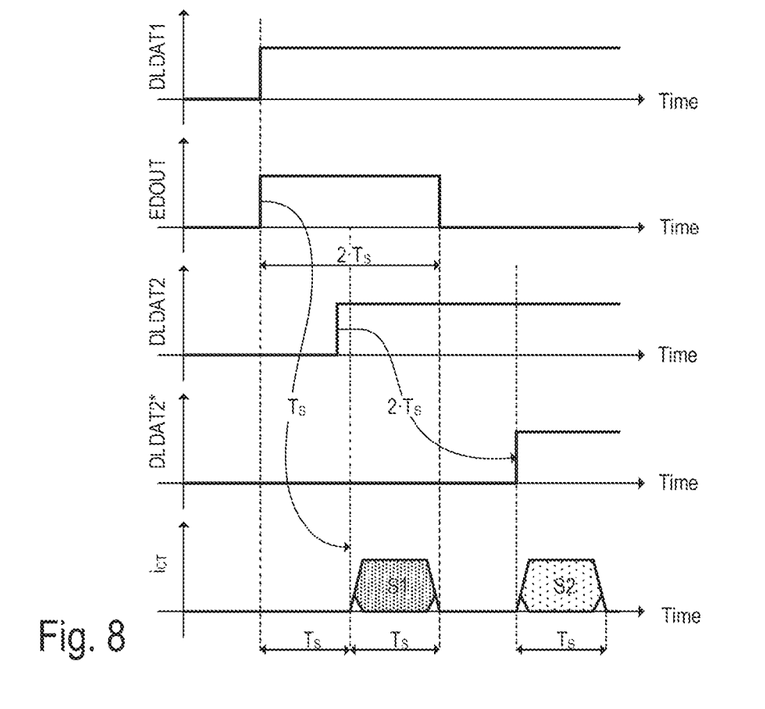
Figure 9:
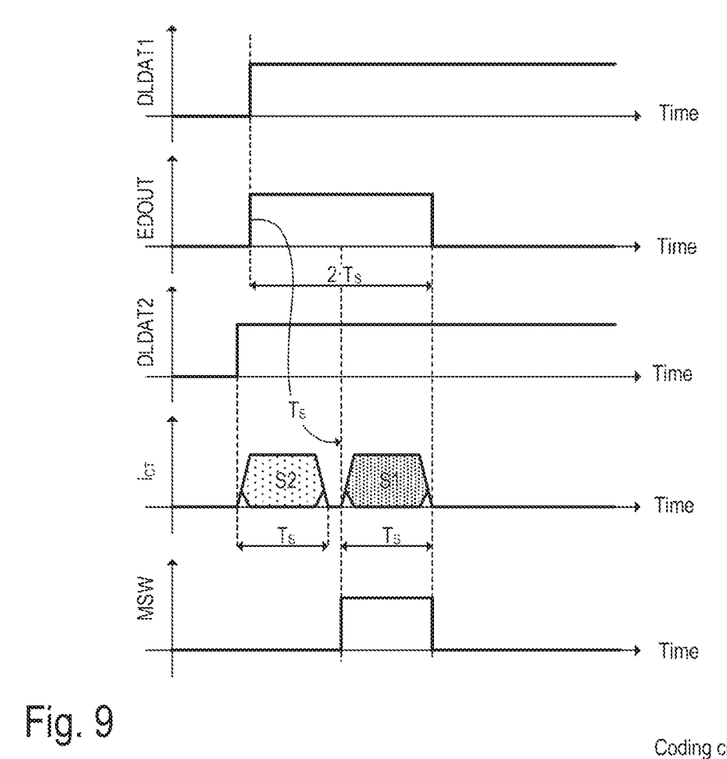

A further approach which allows the transmission of a first high-priority data stream (for example data stream DLDAT1) and at least one further low-priority data stream DLDAT2 via the same coreless transformer (cf. FIG. 4, reference sign 211) is explained on the basis of the timing diagrams in FIGS. 7 to 9. In this case, use is made of the fact that the temporal length $T_S$ of a symbol which is transmitted via the coreless transformer and represents an edge of a digital signal is only a fraction (approximately 10%) of the length of a bit of the high-priority data stream. In order to avoid collisions, the transmission of the edges of the high-priority data stream DLDAT1 is delayed by a period corresponding to the symbol length $T_S$. As soon as an edge of the data stream DLDAT1 is detected, the associated symbol is transmitted a time $T_S$ later via the coreless transformer. This transmission is consequently concluded a time $2T_S$ after the detected edge. The coreless transformer is therefore used for a period $2T_S$ after a detected edge of the high-priority data stream DLDAT1 and cannot be used to transmit other edges.

FIG. 7 uses timing diagrams to illustrate a first of the data transmission, wherein an edge in the low-priority data stream DLDAT2 occurs more than $2T_S$ after an edge in the high-priority data stream DLDAT1. The first diagram (from the top) in FIG. 7 shows a rising edge of the data stream DLDAT1. A detected edge is indicated by a signal EDOUT, the logic level of which is set to "high" for a period $2T_S$ in response to a detected edge in the data stream DLDAT1. That is to say, each detected edge triggers, in the signal EDOUT, a pulse whose length corresponds to twice the symbol length $2T_S$. This signal EDOUT is illustrated in the second diagram in FIG. 7 and indicates that the transmission channel (that is to say the coreless transformer) is being used. However, the detected edge is transmitted only in a manner delayed by a time $T_S$, that is to say in the second half of the pulse of the length $2T_S$ in the signal EDOUT. The symbol representing the edge of the data stream DLDAT1 is denoted S1 in FIG. 4 (see FIG. 7, fourth diagram). The subsequently occurring edge in the data stream DLDAT2 (see FIG. 7, third diagram) is represented by the symbol S2 which is transmitted without delay in the case illustrated.

FIG. 8 illustrates a second case in which an edge of the lower-priority data stream DLDAT2 occurs shortly after an edge of the high-priority data stream DLDAT1. In this case, "shortly after" means that the edge of the data stream DLDAT2 occurs less than a time $2T_S$ after an edge of the data stream DLDAT1, that is to say while the transmission channel is still being used (indicated by the signal EDOUT, see FIG. 8, first, second and third diagrams). In this case, the transmission of the edge of the low-priority data stream DLDAT2 is delayed by at least a time $2T_S$ (see FIG. 8, fifth diagram, symbol S2). The delayed signal is denoted DLDAT2* (see FIG. 8, fourth diagram). The edge of the high-priority signal DLDAT1 is again transmitted with a delay of $T_S$ (see FIG. 8, fifth diagram, symbol S1). The delay in the transmission of the symbol S2 causes jitter in the low-priority data stream DLDAT2. This jitter is acceptable for most applications. However, the delay in the transmission of the symbol S1 does not cause jitter in the high-priority data stream DLDAT1 since this delay is the same for each edge.

FIG. 9 illustrates a third case in which an edge of the lower-priority data stream DLDAT2 occurs shortly before an edge of the high-priority data stream DLDAT1 (see FIG. 9, first and third diagrams). The example illustrated in FIG. 9 shows the advantage of the constant delay of the high-priority data stream DLDAT1 by a symbol length $T_S$. The edge in the data stream DLDAT2 occurs at a time at which the transmission channel is not yet being used and the symbol S2 is transmitted substantially without delay (see FIG. 9, fourth diagram). However, the transmission of the symbol S2 lasts for a maximum time $T_S$ and therefore cannot collide with the—always delayed—transmission of the symbol S1. The symbol S2 will be only in the first half of the pulse in the signal EDOUT, whereas the symbol S1 is always transmitted in the second half of the pulse in the signal EDOUT (see FIG. 9, second and fourth diagrams).

The introduction of a deterministic delay in the transmission of the high-priority data stream DLDAT1 does not cause any jitter (since this delay is introduced for each individual edge) but makes it possible to avoid a collision if another symbol is already being transmitted when an edge of the data stream DLDAT1 is detected. The jitter produced by the delay in the transmission of an edge of the data stream DLDAT2 (cf. FIG. 8) is accepted and is not critical for most applications. The fifth diagram from FIG. 9 is explained further below together with FIG. 10.

Figure 10:
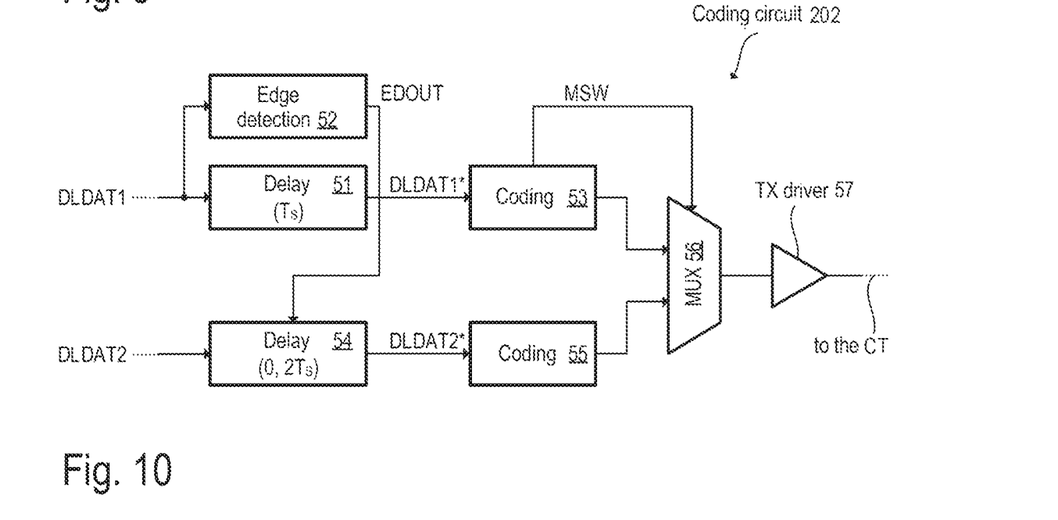
FIG. 10 uses a block diagram to illustrate an exemplary implementation of a coding circuit which can be used in a bus interface circuit according to FIG. 4.

FIG. 10 is a block diagram which shows an exemplary implementation of the coding circuit 202 in order to implement the approach illustrated in FIGS. 7-9. The coding circuit 202 is in the downlink path; the coding circuit 204 in the uplink path can be implemented in the same manner. In the example illustrated, the coding circuit 202 has an edge detection circuit 52 which is supplied with the high-priority data stream DLDAT1 and is designed to detect the edges contained in the data stream DLDAT1. For each detected edge, a pulse of the length $2T_S$ is output at the output of the edge detection circuit 52. The output signal is denoted EDOUT. The edge detection circuit 52 can substantially contain an edge-triggered monostable multivibrator (monoflop) which generates a pulse of the length $2T_S$ as an output signal for each rising and falling edge. The coding circuit 202 has a delay element 51 which is designed to delay the data stream DLDAT1 by a time $T_S$. The delayed data stream DLDAT1* is supplied to the coding unit 53 which is designed to code the edges of the data stream DLDAT1* as symbols (cf. FIG. 7, symbol S1).

The low-priority data stream DLDAT2 is supplied to the delay element 54 which is designed not to delay the clock edges of the data stream DLDAT2 if the edge detection circuit 52 does not indicate a detected edge (EDOUT is at a logic 0 level) and to delay the clock edges of the data stream DLDAT2 by a period $2T_S$ (or more) if the edge detection circuit 52 indicates a detected edge (EDOUT is at a logic 1 level). The (partially) delayed signal DLDAT2* is supplied to the coding unit 55 which is designed to code the edges of the data stream DLDAT2* as symbols (cf. FIG. 7, symbol S2).

The outputs of the coding units 53 and 55 are supplied to a multiplexer 56 which is designed to connect either the output of the coding unit 53 (assigned to the data stream DLDAT1) or the output of the coding unit 55 (assigned to the data stream DLDAT2) to the input of the driver circuit 57 which converts symbols generated by the coding units 53 and 55 into corresponding current signals $i_{CT}$ for the coreless transformer. In order to change over the multiplexer 56, the coding circuit 53, for example, can generate a control signal MSW (cf. FIG. 9, lowermost diagram) which causes the multiplexer 56 to switch through the coded output signal from the coding circuit 53 to the TX driver 57 if a symbol is currently intended to be transmitted. Otherwise, the output of the coding circuit 55 is switched through to the TX driver 57.

Figure 11:
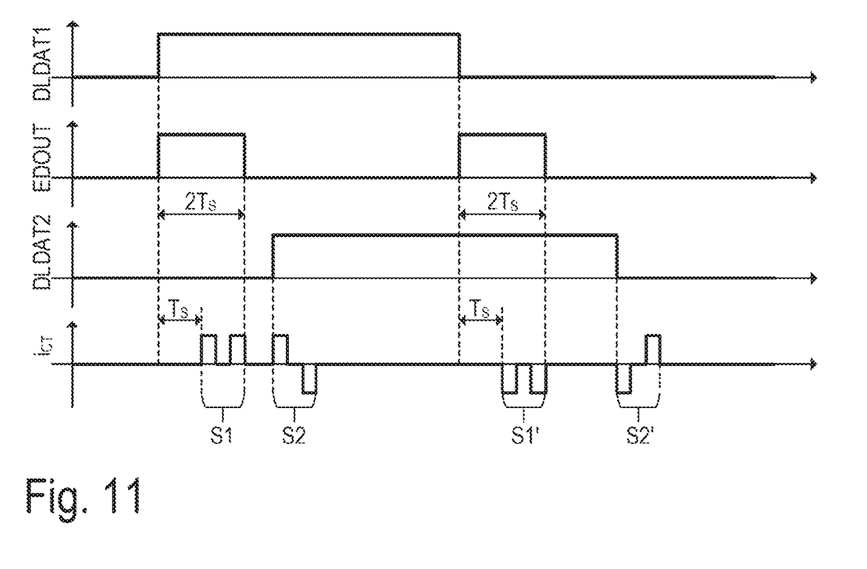
FIG. 11 uses timing diagrams to illustrate, by way of example, the function of the coding circuit from FIG. 10.

FIG. 11 illustrates the function of the coding circuit 202 from FIG. 10 using exemplary timing diagrams. The first half of the timing diagrams from FIG. 11 shows substantially the same situation as in FIG. 7. As can be seen in FIG. 11, the signal EDOUT from the edge detection circuit 52 exhibits a pulse of the length $2T_S$ immediately following an edge (rising and falling) in the high-priority data stream DLDAT1 (see FIG. 11, first and second diagrams). The associated symbols S1 and S1' are transmitted precisely a time $T_S$ after the respective edge, wherein the symbol S1 represents a rising edge and the symbol S1' represents a falling edge (see FIG. 11, first and third diagrams). The edges of the low-priority data stream DLDAT2 (see FIG. 11, first and third diagrams) are not transmitted with a delay (immediately) (symbols S2 and S2' for rising and falling edges) since the edge does not fall in the period which is indicated by the signal EDOUT and in which the coreless transformer is reserved for the transmission of the high-priority data stream DLDAT1. In the example illustrated, a symbol is represented by two short current pulses.

Figure 12:
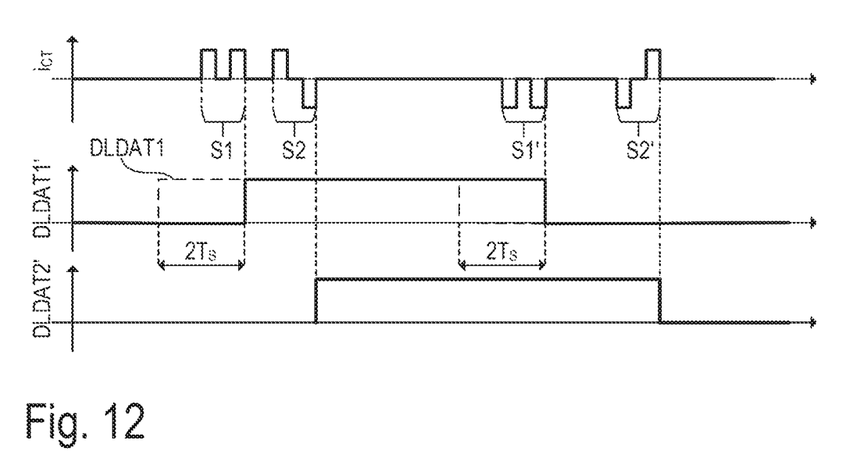
FIG. 12 uses timing diagrams to illustrate, by way of example, the function of a decoding circuit which decodes the signals coded by the coding circuit from FIG. 10.

FIG. 12 uses timing diagrams to show how the current pulses (symbols) transmitted via the coreless transformer are decoded again. The reconstructed data streams are denoted DLDAT1' and DLDAT2'. As soon as the decoding circuit (see FIG. 4, reference sign 203) has received a symbol, the level at the first or second output, at which the first data stream DLDAT1' or the second data stream DLDAT2' is output, is changed depending on the received symbol. That is to say, if a symbol S1 is received, the level at the first output (data stream DLDAT1') is set to "high"; if a symbol S2 is received, the level at the second output (data stream DLDAT2') is set to "high"; if a symbol S1' is received, the level at the first output (data stream DLDAT1') is set to "low" again; and, if a symbol S2' is received, the level at the second output (data stream DLDAT2') is set to "low" again. The original high-priority data stream DLDAT1 is illustrated using dashed lines in the central diagram in FIG. 12. It is seen that the reconstructed data stream DLDAT1' has been delayed by a time $2T_S$. However, this delay is deterministic and does not cause any jitter.

The alternative approach described below makes it possible to transmit a plurality of low-priority signals DLDAT2, DLDAT3, DLDAT4 together with a high-priority signal DLDAT1 via a coreless transformer. As in the preceding examples, edges of the high-priority signal DLDAT1 are transmitted without a significant delay or—alternatively—always with the same constant delay (in a similar manner to the examples from FIGS. 7-9) in order to avoid generating jitter. The logic values of the low-priority signals DLDAT2, DLDAT3, DLDAT4 are combined in one data frame and are transmitted together with the edge of the high-priority signal DLDAT1. At times without communication via the CAN bus (that is to say if no edges occur in the signal DLDAT1), the frame is regularly transmitted, for example if one of the logic levels of the signals DLDAT2, DLDAT3, DLDAT4 changes and/or if a particular period has elapsed. In these cases (transmission of a frame without an edge in the signal DLDAT1), a collision may potentially occur if, during the transmission of a frame, an edge occurs in the high-priority signal DLDAT1. The following examples are used to explain how such a conflict can be resolved.

Figure 13:
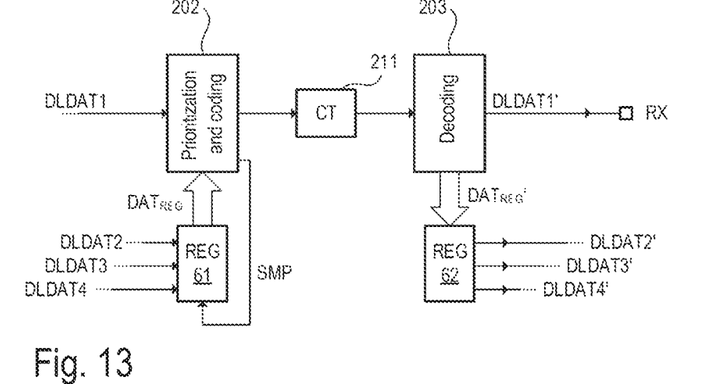
FIG. 13 uses a block diagram to illustrate a further exemplary embodiment of a coding circuit which can be used in a bus interface circuit according to FIG. 4, wherein the states of the low-priority data streams are stored in a register and the content of the register is transmitted, together with the state of the higher-priority data stream, in a frame via the coreless transformer.

FIG. 13 is a simplified block diagram of an exemplary implementation of a bus interface circuit 2 similar to FIG. 4. For the sake of simplicity, only the transmission path in the downlink path via the coreless transformer 211 is illustrated. The uplink path may have substantially the same structure (cf. FIG. 4). The illustrated example is substantially the same as the example from FIG. 4, wherein registers 61, 62 which can store the logic levels of the low-priority signals DLDAT2, DLDAT3, DLDAT4 are additionally provided. During the transmission of a frame, the coding circuit 202 reads the content of the register 61 and composes the information contained therein to form a frame. During transmission, updating of the content of the register 61 is blocked by the signal SMP (sampling signal). The decoding circuit 203 receives the symbols received via the coreless transformer 211 and reconstructs the high-priority signal DLDAT1' and the low-priority signals DLDAT2, DLDAT3, DLDAT4, wherein the binary values of the signals DLDAT2, DLDAT3, DLDAT4 are written to the register 62. The reconstructed signals DLDAT2', DLDAT3', DLDAT4' can be tapped off at the output of the register 62. The registers 61 and 62 may be implemented as shift registers, for example.

Figure 14:
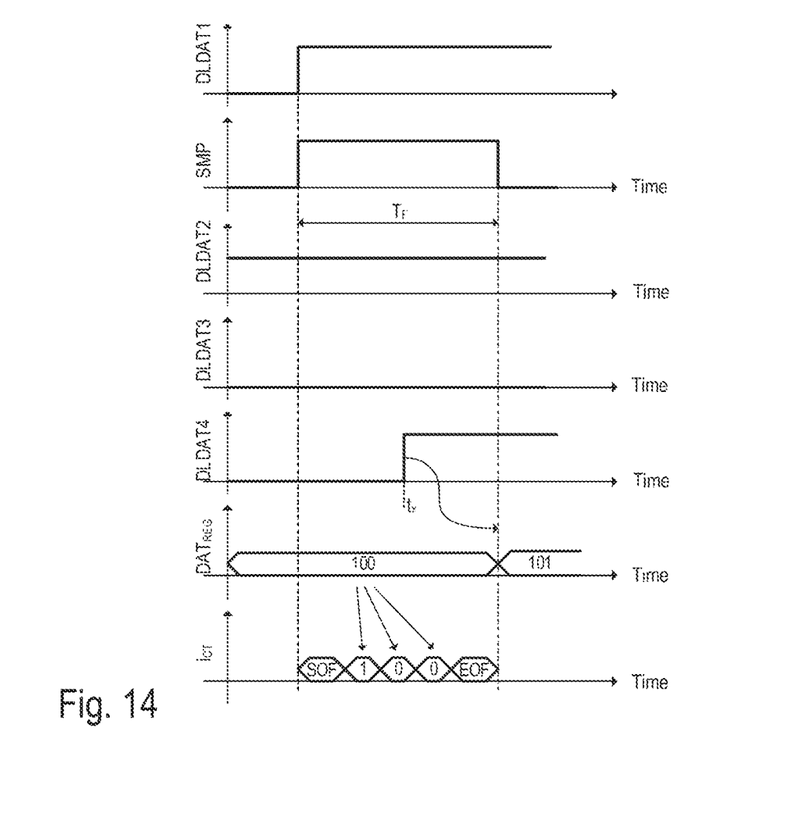
FIGS. 14-16 use exemplary timing diagrams to illustrate a further scheme for simultaneously transmitting two or more data streams via a coreless transformer, wherein the states of a plurality of data streams are combined in a frame.

The method of operation of the coding circuit 202 is explained in more detail below using timing diagrams. FIG. 14 contains exemplary timing diagrams of the high-priority signal DLDAT1, the sampling signal SMP which blocks updating of the content of the register 61 during the transmission of a frame, the low-priority signals DLDAT2, DLDAT3, DLDAT4, the register content $REG_{DAT}$ of the register 61 and the symbols transmitted via the coreless transformer (signal $i_{CT}$). As mentioned, the transmission of a frame is triggered by the detection of an edge in the high-priority signal DLDAT1. In the present example, the transmission is carried out virtually without a significant delay. The signal SMP exhibits a pulse of the length $T_F$ which corresponds substantially to the temporal length of a frame. During this time $T_F$, updating of the register 61 is blocked in order to keep the register content consistent. In the example illustrated, the content of the register is initially "100" (high level of the signal DLDAT2, low level of the signal DLDAT3 and low level of the signal DLDAT4) and subsequently changes to "101" (high level of the signal DLDAT2, low level of the signal DLDAT3 and high level of the signal DLDAT4). The signal DLDAT4 changes from "0" to "1" already at the time $t_x$, but the register 61 is updated only thereafter, after the transmission of the frame has been concluded (that is to say with the falling edge of the signal SMP). The transmission of the frame is triggered by the detection of an edge in the signal DLDAT1 and begins without a significant delay in the present example. A frame begins with a start symbol SOF (Start of Frame) and ends with a closing symbol EOF (End of Frame). 0 symbols and 1 symbols are transmitted according to the content of the register 61 between the symbols SOF and EOF.

Figure 15:
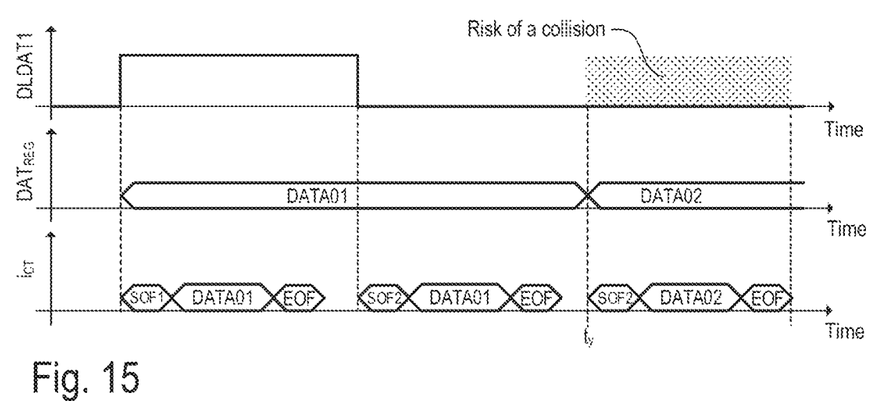

FIG. 15 illustrates, as a further example, a situation in which the content of the register 61 (that is to say one of the low-priority signals DLDAT2, DLDAT3, DLDAT4) changes in a phase in which no communication is taking place on the CAN bus. The first transmission of a frame illustrated in FIG. 15 (lower diagram) is triggered by a rising edge in the high-priority signal DLDAT1. The second transmission of a frame is triggered by a falling edge in the high-priority signal DLDAT1. During frame transmission, a distinction is made in this case between the start symbols SOF1 and SOF2 which in this case respectively represent a rising and a falling edge of the signal DLDAT1. In the example illustrated, the content of the register 61 changes at the time $t_y$. Since no communication is taking place on the CAN bus at this time, the transmission of a frame is triggered in this situation by the change in the content of the register 61. The third transmission of a frame illustrated in FIG. 15 again begins with the start symbol SOF2 for a falling edge. Since the state of the signal DLDAT1 is already a low level, the signal DLDAT1 is not influenced by the third frame transmission, but rather only the register content is transmitted. Additionally or alternatively, further frames can be transmitted at predefined intervals of time as long as no communication is taking place on the CAN bus.

In the example illustrated in FIG. 15, it becomes clear that a frame transmission which is not triggered by an edge of the high-priority signal DLDAT1 entails the risk of a collision/conflict. A conflict would arise when, during the transmission of the third frame via the coreless transformer, an edge occurred in the high-priority signal DLDAT1 (shaded region in the first diagram in FIG. 15). In this case, the frame transmission must be aborted and restarted in order to transmit an edge of the signal DLDAT1 since later transmission would cause jitter. An example of such a frame abort is illustrated in FIG. 16.

Figure 16:
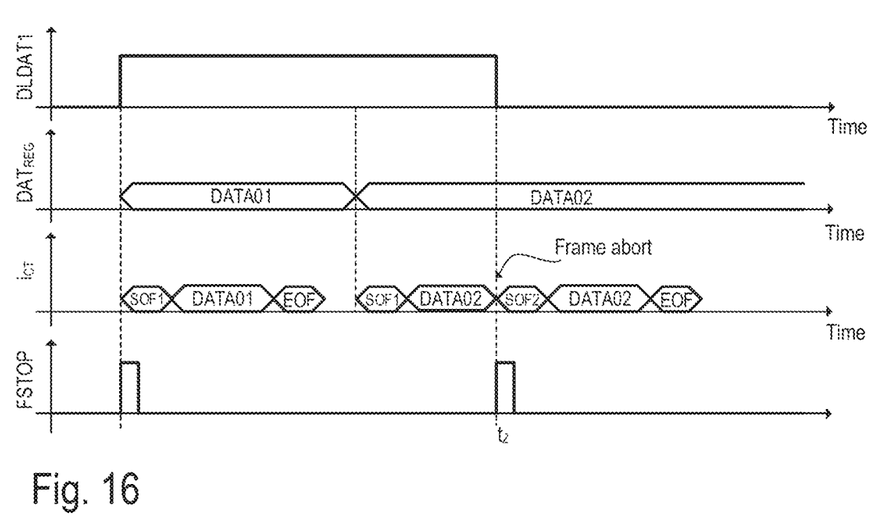

In the example illustrated in FIG. 16, the transmission of the first frame is triggered by a rising edge in the signal DLDAT1 The frame begins with the start symbol SOF1 which indicates a rising edge. The content of the register 61 subsequently changes without communication taking place on the bus. The transmission of the second frame is therefore triggered by the change in the register content. However, during frame transmission—at the time $t_z$—a falling edge is detected in the high-priority signal DLDAT1 and the frame transmission must be aborted. The frame abort is signaled by the signal FSTOP (short pulse at the time $t_z$) which is triggered by the detected falling edge. In the decoding circuit, the incompletely transmitted frame is identified by virtue of the fact that a start symbol (symbol SOF2 in the example illustrated) is received without a closing symbol EOF having been received beforehand. The incompletely received frame is discarded in the decoder.

If the transmission of a frame is aborted at an "unfavorable" temporal position, the problem may arise of an only partially transmitted symbol being incorrectly interpreted in the decoder. In order to avoid this problem, it should be ensured that an aborted data symbol (0 symbol or 1 symbol) cannot be decoded, together with a subsequent start symbol (SOF1 or SOF2), as a closing symbol (EOF) and an aborted data symbol cannot be prematurely decoded, together with a subsequent start symbol, as a start symbol. In the first case (aborted data symbol plus start symbol is decoded as EOF), the transmitted edge of the high-priority signal would be lost and, in the second case (aborted data symbol plus start symbol is decoded early as a start symbol), an edge would be produced early in the high-priority signal and jitter would be generated thereby. This situation is illustrated in FIG. 17 which illustrates examples of the data symbols (0 symbol and 1 symbol) and the start symbols SOF1 and SOF2 which represent rising and falling edges.

Figure 17:
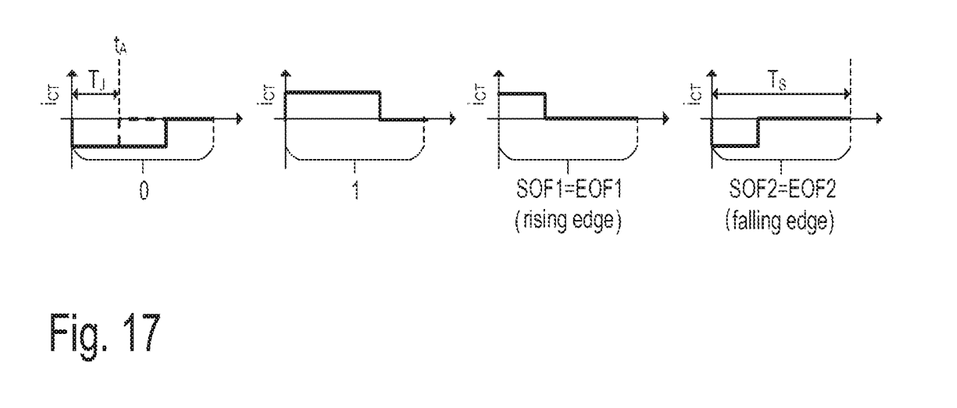
FIG. 17 illustrates examples of the implementation of different symbols for transmitting information via a coreless transformer.

FIG. 17 contains four diagrams, wherein (from left to right) a 0 symbol, a 1 symbol, a start symbol SOF1 for rising edges and a start symbol SOF2 for falling edges are respectively illustrated. The closing symbols EOF1, EOF2 can be the same as the associated start symbols SOF1 and SOF2. The data symbols are formed by long current pulses, whereas the start symbols are formed by short current pulses. In all cases, the symbol length is always $T_S$. In the left-hand diagram in FIG. 17 (0 symbol), it can be seen that the start symbol SOF2 is produced in the event of a premature abort of the 0 symbol at the time $t_A$ (for example the time of a detected falling edge in the high-priority signal). However, this start symbol which is incorrectly identified in the decoder as SOF2 begins a time $T_J$ before the time $t_A$, which results in corresponding jitter.

Figure 18:
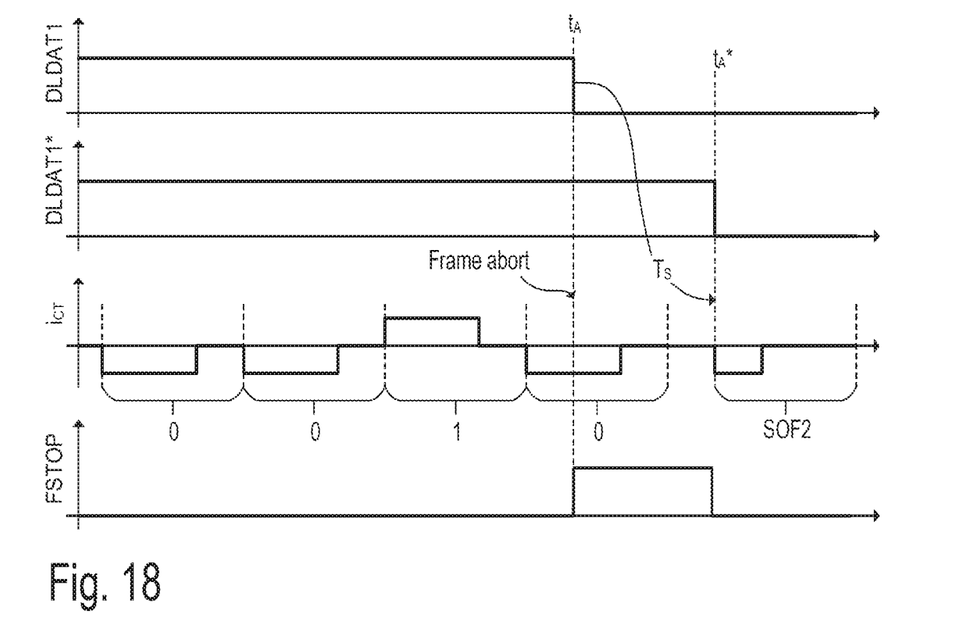
FIG. 18 uses exemplary timing diagrams to illustrate the interruption in a frame transmission and the start of a new frame transmission, wherein incomplete symbols are avoided by introducing a deterministic delay.

In order to avoid jitter in the event of a frame abort, a deterministic delay (dead time, latency) of one symbol length $T_S$ can be introduced—in a similar manner to that in the examples according to FIGS. 7-9. In the event of a frame abort, an (already started) transmission of a symbol can therefore always be concluded before the transmission of a new frame begins. An example of this approach is illustrated in FIG. 18. The first two timing diagrams (from the top) from FIG. 18 show the high-priority data stream DLDAT1 with a falling edge at the time $t_A$ and the data stream DLDAT1* delayed by a symbol length $T_S$. The edge occurs at the time $t_A$ while a frame is currently being transmitted via the cureless transformer (see third diagram from FIG. 18). An immediate abort of the frame transmission at the time $t_A$ would abort the transmission of the 0 symbol after approximately the first third of the symbol, which would cause a situation like in the first diagram in FIG. 17 (early start symbol causes jitter). As a result of the introduction of a—deterministic and always identical—delay by a symbol length $T_S$ (provided that the frame transmission is triggered by an edge in the high-priority data stream DLDAT1), the current transmission of a symbol can be correctly completed in the event of a frame abort before the transmission of the new frame begins. This approach causes unproblematic additional latency, which corresponds to the delay $T_S$, but does not cause any jitter. In the example illustrated, the frame abort is indicated by a pulse in the signal FSTOP (fourth diagram in FIG. 18).

Figure 19:
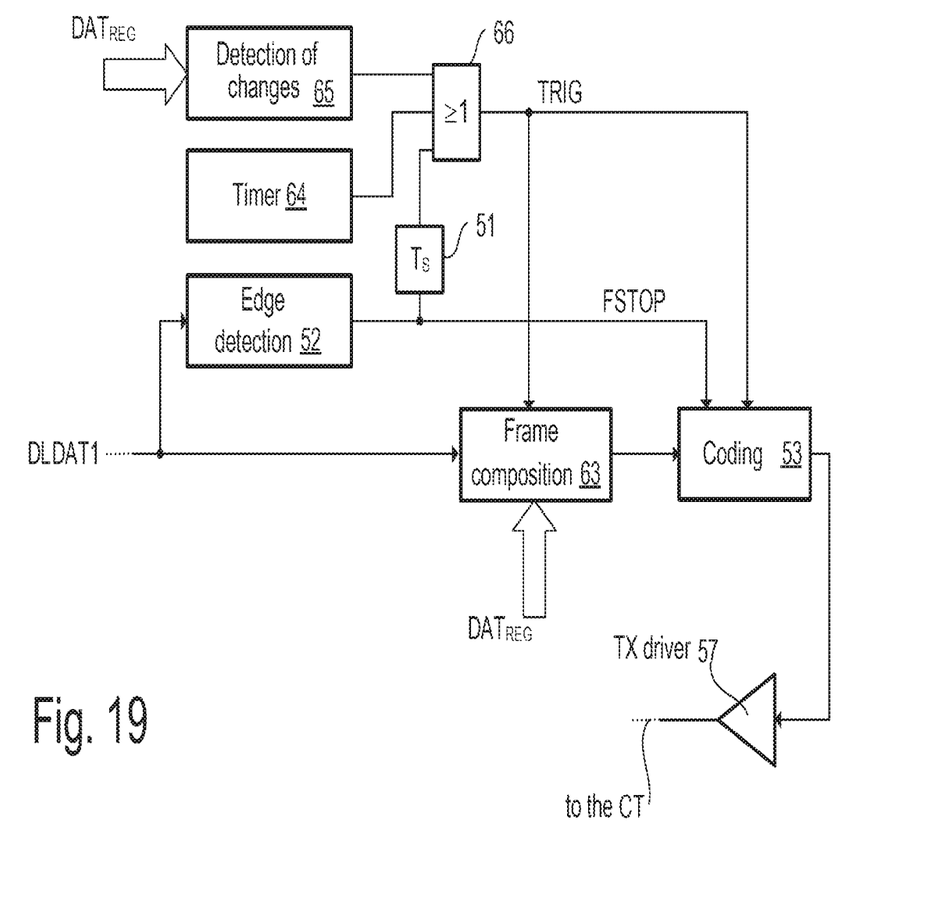
FIG. 19 illustrates an exemplary implementation of the example from FIG. 13 in more detail.

FIG. 19 illustrates an exemplary implementation of the coding circuit 202 from FIG. 13 in more detail. In the example illustrated, the coding circuit 202 comprises a frame composition unit 63 which receives the high-priority data stream DLDAT1, the content $REG_{DAT}$ of the register 6 and a trigger signal TRIG. The frame composition unit 63 can be designed to compose a frame representing the current state of the high-priority data stream DLDAT1 and the register content $REG_{DAT}$ in response to the trigger signal TRIG. A frame is initially only a sequence of symbols which is supplied to the coding unit 53. The coding unit 53 is designed to convert the symbols into an accordingly modulated driver signal (cf., for example, FIG. 17). The driver 57 is connected downstream of the coding unit 53 and, in accordance with the driver signal, generates a modulated current $i_{CT}$ which is supplied to the primary side of the coreless transformer and is transmitted the coreless transformer.

As mentioned, the transmission of a frame is triggered by the trigger signal TRIG. In the present example, the trigger signal TRIG is an OR combination (by means of OR gate 66) of the output signals from an edge detection unit 52, a timer 64 and a circuit 65 which indicates a change in the content of the register 61 (see FIG. 13). The transmission of a frame is therefore triggered the following events: (a) an edge is detected in the high-priority signal DLDAT1, (b) the content of the register 61 has changed and (c) a defined time has elapsed since the last transmission (indicated by timer 64). If—as in the example from FIG. 18—a deterministic delay is intended to be introduced between an edge in the data stream DLDAT1 and the transmission of a frame, the delay can be achieved by means of a delay element 51 between the edge detection unit 52 and the OR gate 66. A frame abort is signaled by the signal FSTOP which is generated by the edge detection unit 52 when an edge is detected and is supplied to the coding circuit 53.

The coding circuits 202 and 204 can be implemented in many different ways. The implementations shown in FIGS. 4, 10, 13 and 18 should be understood merely as examples, and it goes without saying that a person skilled in the art will find various other implementations which perform substantially the same function which has been explained in detail in connection with the timing diagrams illustrated in the figures. The coding circuits 202 and 204 and the decoding circuits 203 and 205 (see FIGS. 4 and 13) can be implemented by means of known digital circuit components and programmable circuits (for example programmable logic circuits). In some exemplary embodiments, at least some components of the coding circuits and/or decoding circuits can be implemented by means of a processor and suitable firmware.

The examples described here relate to the transmission of data streams via a coreless transformer in the downlink path (that is to say to the microcontroller, cf. FIG. 1). Even if not explicitly illustrated, data streams are transmitted in the uplink path (that is to say from the microcontroller, cf. FIG. 1) in a similar manner. It goes without saying that other galvanically isolating components, for example optocouplers, capacitive components, etc., can also be used instead of coreless transformers in the exemplary embodiments described here. It is also noted that the implementations illustrated in FIGS. 4, 10, 13 and 19 should be understood merely as examples, and a person skilled in the art is able to easily find other or modified implementations which perform substantially the same function.

The concepts described here for transmitting high-priority data streams (ULDAT1 and DLDAT1) and further, low-priority data streams (DLDAT2, DLDAT3, etc., ULDAT2, ULDAT3, etc.) via a galvanically isolating transmission path were used, in the exemplary embodiments described here, in a bus interface in order to make it possible to transmit data from the bus and to the bus (downlink/uplink) without jitter and to make it possible to transmit further data the same time. However, these concepts can be easily applied to other interface circuits and need not necessarily be used in conjunction with bus systems.

The invention claimed is:
1. An interface circuit comprising:
a galvanically isolating component;
a coding circuit which is designed:
    to receive a first data stream and at least one further data stream,
    to code the first data stream by assigning first symbols to falling and rising edges of the first data stream, to code the at least one further data stream by assigning second symbols to edges or levels of the at least one further data stream, and to construct a symbol sequence from the first symbols and the second symbols and to supply the symbol sequence to the galvanically isolating component;

a decoding circuit which is coupled, via the galvanically isolating component, to the coding circuit in order to receive the symbol sequence from the coding circuit and is designed to:

decode the symbol sequence and to reconstruct the first data stream and the at least one further data stream therefrom;

wherein the coding circuit is designed to construct the symbol sequence in such a manner that the first symbols are always delayed by a same value relative to associated edges of the first data stream.

2. The interface circuit according to claim 1, wherein the symbol sequence contains a plurality of frames of symbols, and wherein the coding circuit has a frame composition unit which is designed to construct the frames of symbols, wherein each frame has, as a start symbol, a first symbol, and at least one second symbol.

3. The interface circuit according to claim 2, wherein the frame composition unit is designed to generate a new frame in response to an edge of the first data stream.

4. The interface circuit according to claim 2, wherein the frame composition unit is designed to generate a new frame in response to an edge of the first data stream, wherein the new frame has a delay which is equal to a length of a symbol or longer relative to the edge of the first data stream.

5. The interface circuit according to claim 3, wherein the frame composition unit is designed to also generate the new frame in response to a timer signal and/or in response to a change in the edges or levels of the at least one further data stream and to abort the generation of the new frame in response to the edge of the first data stream.

6. The interface circuit according to claim 1, wherein the coding circuit includes a first coding unit which is designed to generate a first symbol in response to an edge of the first data stream, wherein the first symbol is delayed by a length of the first symbol or the second symbol or more relative to the edge of the first data stream, and wherein the coding circuit includes a second coding unit which is designed to generate a second symbol in response to an edge of at least one further data stream, wherein the second symbol is delayed by an adjustable delay time relative to the edge of the at least one further data stream.

7. The interface circuit according to claim 6, wherein the interface circuit is a bus interface circuit, wherein the coding circuit includes a delay unit which determines the adjustable delay time, wherein the delay unit temporarily sets the adjustable delay time to a value of two symbol lengths associated with either the first symbol or the second symbol or more in response to the edge of the first data stream.

8. The interface circuit according to claim 1, wherein the first data stream is formatted according to a transmission protocol, and wherein the coding circuit is designed to construct the symbol sequence in such a manner that the second symbols are transmitted via the galvanically isolating component only when no edges can occur in the first data stream according to the transmission protocol.

9. The interface circuit according to claim 8, wherein a value of a delay of the first symbols is approximately zero.

10. The interface circuit according to claim 1, wherein the first data stream is in sync with a clock signal having a clock period, and wherein the coding circuit is designed to generate a first symbol in response to an edge of the first data stream and to then generate a second symbol at a sampling time before expiry of a clock period, wherein the second symbol represents the edges or levels of the at least one further data stream at the sampling time.

11. The interface circuit according to claim 10, wherein the coding circuit is also designed to reconstruct the clock signal on a basis of the first data stream.

12. A method comprising:

coding a first data stream by assigning first symbols to falling and rising edges of the first data stream;

coding a further data stream by assigning second symbols to edges or levels of said further data stream;

constructing a symbol sequence from the first symbols and the second symbols, wherein the symbol sequence is constructed in such a manner that the first symbols are always delayed by a same value relative to associated edges of the first data stream;

transmitting the symbol sequence via a galvanically isolating component; and decoding the symbol sequence transmitted via the galvanically isolating component in order to reconstruct the first data stream and the further data stream.

13. The method according to claim 12, wherein the symbol sequence is constructed from a plurality of frames that include a plurality of symbols, and wherein each frame has a start symbol, a first symbol, and at least one second symbol.

14. The method according to claim 13, wherein a new frame is generated in response to an edge of the first data stream.

15. The method according to claim 14, wherein a new frame is also generated in response to a timer signal and/or in response to a change in the edges or levels of the at least one further data stream, and wherein the generation of the new frame is aborted in response to an edge of the first data stream.

16. The method according to claim 13, wherein a new frame is generated in response to an edge of the first data stream, and wherein the new frame has a delay which is equal to a length associated with either the first symbols or the second symbols or longer relative to a respective edge of the first data stream.

17. The method according to claim 12, wherein a first symbol is generated in response to an edge of the first data stream, wherein the first symbol is delayed by a length associated with either the first symbols or the second symbols or more relative to the edge of the first data stream, and wherein a second symbol is generated in response to an edge of at least one second data stream, wherein the second symbol is delayed by an adjustable delay time relative to the edge of the at least one second data stream.

18. The method according to claim 17,
wherein the adjustable delay time is temporarily set to a value of two symbol lengths associated with either the first symbol or the second symbol or more in response to the edge of the first data stream.

19. The method according to claim 12,
wherein the first data stream is formatted according to a transmission protocol; and
wherein the symbol sequence is constructed in such a manner that the second symbols are transmitted via the galvanically isolating component only when no edges can occur in the first data stream according to the transmission protocol.

20. The method according to claim 19,
wherein a value of a delay of the first symbols is approximately zero.

21. The method according to claim 12,
wherein the first data stream is in sync with a clock signal having a clock period, and
wherein a first symbol is transmitted in response to an edge of the first data stream and a second symbol is then generated at a sampling time before expiry of a clock period, wherein the second symbol represents a level of the at least one further data stream at a sampling time.

* * * * *